UNITED STATES PATENT OFFICE.

HIPPOLYTE MÉGE, OF PARIS, FRANCE.

IMPROVEMENT IN TREATING ANIMAL FATS.

Specification forming part of Letters Patent No. 146,012, dated December 30, 1873; application filed November 1, 1873.

*To all whom it may concern:*

Be it known that I, HIPPOLYTE MÉGE, of Paris, France, chemical manufacturer, have invented Improved Means for Transforming Animal Fats into Butter, of which the following is a specification:

My invention, which is the result of physiological investigation, consists of artificially producing the natural work which is performed by the cow when it reabsorbs its fat in order to transform the same into butter. The improved means I employ for this purpose are as follows:

First. Neutralization of the ferments.—In order to prevent the greasy substance which is settled in the tissue of the animals from taking the disagreeable taste of the fat, it is necessary that the ferments which produce this taste shall be completely neutralized. For this effect, as soon as possible after the death of the animal, I plunge the raw fats—called "graisses en branches"—into water containing fifteen per cent. of sea-salt and one per cent. of sulphite of soda. I begin thus the transformation an hour, at least, after the immersion, and twelve hours, at most, afterward.

Secondly. Crushing.—A complete crushing is necessary in order to obtain rapid work without alteration. For this purpose, when the substance is coarsely crushed, I let it fall from the cylinders under millstones, which completely bruise all the cells.

Thirdly. Concentrated digestion. — The crushed fat falls into a vessel which is made of well-tinned iron, or enameled iron, or baked clay. This vessel must be plunged in a water-bath, of which the temperature is raised at will. When the fat has descended in the vessel, I melt it by means of an artificial digestion, so that the heat does not exceed 103° Fahrenheit, and thus no taste of fat is produced. For this purpose I throw into the wash-tub containing the artificial gastric juice about two liters per hundred kilograms of greasy substance. This gastric juice is made with the half of a stomach of a pig or sheep, well washed, and three liters of water containing thirty grams of biphosphate of lime. After a maceration during three hours, I pass the substance through a fine sieve, and I obtain the two liters which are necessary for a hundred kilograms. I slowly raise the temperature to about 103° Fahrenheit, so that the matter shall completely separate. This greasy matter must not have any taste of fat; it must, on the contrary, have the taste of molten butter. When the liquid does not present any more lumps, I throw into the said liquid one kilogram of sea-salt, reduced to powder, per hundred kilograms of greasy matter. I stir during a quarter of an hour, and let it sit until obtaining perfect limpidness. This method of extraction has a considerable advantage over that which has been previously essayed. The separation is well made, and the organized tissues which do deposit are not altered.

Fourthly. Crystallization in a mass.—In order to separate the oleomargarine of the stearine, separated crystallizers or crystallizations, at unequal temperatures, have been already employed. I have contrived for this purpose the following method, which produces a very perfect separation, and is as follows: I send the molten fat in a vessel, which must be sufficient for containing it. This vessel is placed in a wash-tub of strong wood, which serves as a water-bath. In this wash-tub I put water at the fixed temperature of 86° Fahrenheit for the soft fats proceeding from the slaughter-houses, and 98° for the harder fats, such as mutton fat. Afterward the wash-tubs are covered, and after a certain time, more or less long, according to the fats, the stearine is deposed in the form of teats at the middle of the oleomargaric liquid.

Fifthly. Separation by centrifugal force.— In order to avoid the numerous inconveniences of the employment of the presses which have been hitherto used, I cause the mixture of stearine and oleomargarine to flow into a centrifugal machine, called "hydro-extractor." The greasy liquid passes through the cloth, and the stearine is collected. When all the liquid is passed, I put the machine in motion, and the crystals of stearine are entirely exhausted without the auxiliary of the presses. However, during certain seasons, there are animals which produce crystals of stearine soft enough for rendering necessary the stroke of a press as a last operation; but, in this case, this operation has little importance, because it is applied only to a fraction of the product. In all cases the oleomargarine is separated from the stearine. When it is cold and passed to the cylinder, it constitutes (especially if its yellow color has been raised) a greasy matter of very good taste, and which may replace the butter in the kitchen, where it is employed under the name of "margarine;" but if it is desired to transform it into more perfect butter, I employ the following means:

Sixthly, in the methods hitherto employed, the margarine is transformed into cream, and this latter into butter. This complicated operation has many inconveniences. I obtain the same result by the following manner: I take ten liters of natural and fresh cream of milk. I add ten grams of bicarbonate of soda and two hundred grams of the udders of a cow, which must be fresh and well hacked, in order to give all the mammary pepsin. (The fresh udder may be replaced by udder collected in slices in sea-salt.) After a maceration of an hour, I pass the whole through a very fine sieve; I add the necessary quantity of yellow color, which is employed for the ordinary butter, and I put these ten liters into a hundred kilograms of liquid margarine at 70°. I stir or mix until the combination is complete—that is to say, until the pepsin has effectuated its action. At this moment the liquid becomes thick, it takes the taste of cream, and after it has been more thoroughly agitated, I let the same become completely cold. When the butter is cold and solid, I coarsely scrape it, in order to pass it between two large cylinders, which give it the homogeneousness and the consistence which are the qualities of the natural butter.

Seventhly, when it is desired to produce butter intended to be preserved, which must contain no animal matter, I plunge the udders into pure water instead of cream, in order to macerate the same. Afterward the water which proceeds from this operation is mixed with the margarine at about 86° of temperature—that is to say, to a degree which permits the pepsin to effectuate its action without production of cream. After an hour I let the liquid sit, and the margarine, which is decanted, is mixed, after it has been reduced in temperature to about 71°, with an emulsion of butter, made with five liters of water, five kilograms of butter, one kilogram of sea-salt, or more, according to the uses, and ten kilograms of bicarbonate of soda. When I add this emulsion with the margarine, which has already been submitted to the pepsic action, I obtain a rapid combination, and all the molecules take the qualities of the ordinary butter. It is a delicate operation, which must be very exactly made.

Eighthly, for the long conservations, I only treat the margarine by the mammary pepsin. As before described, I decant it in order to avoid any trace of water or animal matter. If it is desired to add ordinary butter, I do that at the temperature of 71° by well diluting it.

Ninthly. The stearine which has been separated from the margarine forms a hard fat, which can be bleached by the known processes, in order to produce wax candles of lower quality; but it is preferable to saponify it by any convenient process, and crystallize the greasy acids (which are charged with from seventy to eighty per cent. of stearic acid instead of fifty) in a chamber heated to 96°, so as not to let them become hard by the cooling. In this state they can be pressed under heat, in order to produce stearic acid, much superior to that of the trade, both by its beauty or by its point of melting.

What I claim is—

1. The improved material herein described, produced by treating animal fats so as to remove the tissues and other portions named, with or without the addition of substances to change the flavor, consistency, or color, as set forth.

2. The process herein described of treating animal fats in the production of oleomargarine.

In testimony whereof I have signed my name to this specification before two subscribing witnesses.

H. MÉGE.

Witnesses:
CHAS. AVERY DOREMUS,
THOS. C. DOREMUS, Jr.